United States Patent [19]

Nussrallah et al.

[11] Patent Number: 4,792,848

[45] Date of Patent: Dec. 20, 1988

[54] CABLE TELEVISION IMPULSE PAY PER VIEW SYSTEM

[75] Inventors: Steve Nussrallah, Alpharetta; James Farmer, Lilburn, both of Ga.

[73] Assignee: Scientific-Atlanta, Inc., Atlanta, Ga.

[21] Appl. No.: 936,788

[22] Filed: Dec. 2, 1986

[51] Int. Cl.⁴ .............................................. H04N 7/10
[52] U.S. Cl. ...................................... 358/86; 358/84; 358/349; 455/2
[58] Field of Search ........................... 358/84, 86, 349; 370/124; 455/2, 4, 5

[56] References Cited

U.S. PATENT DOCUMENTS

| | | | |
|---|---|---|---|
| 3,987,398 | 10/1976 | Fung | 455/4 |
| 4,222,066 | 9/1980 | Zelenz | 455/4 X |
| 4,361,903 | 11/1982 | Ohta | 455/2 |
| 4,367,557 | 1/1983 | Stern et al. | 455/4 |
| 4,484,218 | 11/1984 | Boland et al. | 358/86 |
| 4,566,030 | 1/1986 | Nickerson et al. | 358/84 |
| 4,574,305 | 3/1986 | Campbell et al. | 358/86 |
| 4,580,161 | 4/1986 | Petrus et al. | 358/86 |

Primary Examiner—Keith E. George
Attorney, Agent, or Firm—Banner, Birch, McKie & Beckett

[57] ABSTRACT

A cable television system is disclosed wherein a subscriber can select a program to view at the last minute and pay for only those programs that are viewed. The system includes a plurality of remote taps which are operative to receive the television signals from a headend office and either supply or deny certain of those signals to a subscriber at his request. The taps will transmit billing information regarding the programs supplied to the subscriber along the cable. At the end of the cable or at other predetermined locations the signals from a plurality of taps are collected and either stored or recovered by the headend. The transmission can be accomplished using a modem or a dedicated wire.

20 Claims, 3 Drawing Sheets

CABLE TELEVISION IMPULSE PAY PER VIEW SYSTEM

BACKGROUND OF THE INVENTION

This invention relates to a system for reporting back to a centrally located office, the viewing of certain premium programming for which a subscriber is billed in addition to his regular monthly subscription fee. This practice is popularly referred to as "pay-per-view" (PPV). More specifically, the subject invention relates to the most desirable type of PPV, known as "impulse pay-per-view" (IPPV). An IPPV system allows a subscriber to order a program at the last minute.

Early PPV systems worked with one way addressable set-top terminals. A subscriber who wished to order a PPV event did so by calling an operator and orally placing his order. The operator entered the order into a computer, which then transmitted authorization to the subscriber's set-top terminal.

This system suffers from the requirement of using the telephone and a human operator. This raises the cost of handling PPV requests, and effectively eliminates IPPV as a viable service since only a limited number of people could call in during the last minutes before a program begins. Therefore, the majority of people desiring to view a program must order it long before it begins.

Some prior art exists which purports to solve the IPPV problem. One such system employs a two-way cable television (CATV) plant, in which the set-top terminal may be equipped for transmitting a signal back to the headend ("upstream transmission") on a suitable (frequency, such as between 5 MHz and 30 MHz. The terminal transmits information as to what programs are being or have been viewed to a computer at the headend. This system suffers from the fact that no protocols have been developed which operate efficiently in an environment of an exceedingly large number of talkers who speak very little, but who must be serviced quickly when they do speak. Further, two-way CATV plants have proved difficult to maintain with adequate integrity to permit reliable return transmission, and the cost of the plant is excessive compared to the revenues to be gained from IPPV.

Another system uses credits downloaded to the terminal, and then makes deductions against the credits when a program is viewed. At the end of the month, certain alpha-numeric characters are displayed, indicating programs viewed. The subscriber writes these characters on a card which is mailed to the CATV operator. This system suffers from excessive delay in reporting programs watched, a limited number of programs which can be viewed (due to the limited number of characters a subscriber can be expected to write down), and the possibility of unrecoverable errors in transcription.

A similar system is disclosed in U.S. Pat. No. 4,484,217 to Block et al. In this system, credits are downloaded to the terminal and deductions are made when programs are viewed. An indicator informs the subscriber that the stored credit has expired or is low. The headend office, upon receipt of payment, will add credits to the subscriber's terminal and the indicator will be extinguished. In this system the subscriber must pay in advance and may miss programs due to the delay in crediting his account.

U.S. Pat. No. 3,676,580 to Beck discloses a system in which telephone lines are used to transmit billing information back to the central office. In Beck's system each subscriber is provided with a transponder which will transmit the billing information along the telephone lines. Since each subscriber's information is reported over a separate telephone line, the cost is excessive as is the time required to obtain viewing information on thousands of customers.

European Patent Application No. 0128481 discloses the use of remote units at a plurality of locations for accumulating and transmitting information about a plurality of viewers to the central office. At pre-selected times, the remote unit initiates a telephone call to the central office and transmits its stored data. This system has a cable converter associated with each user that will receive instructions from the user and supply a television signal accordingly. Each converter is also connected to one of the remote units and the information regarding the selected programs is supplied to the remote unit for storage and eventual transmission to the headend. Since the remote unit is directly connected to the cable converter, the unit must be relatively close to the subscriber. This necessitates a large number of remote units throughout the cable system and, consequently, a large number of telephone links to transmit the stored information back to the headend.

SUMMARY OF THE INVENTION

Accordingly, it is the principle object of the present invention to provide an improved cable television system whereby a subscriber can quickly and easily select a program to view and whereby the headend office can be accurately and efficiently informed of each subscriber selection.

Another object of the present invention is to reduce the number of telephone links that must be established to communicate subscriber billing information to the headend office.

A further object of the present invention is to reduce subscriber participation in the information retrieval process.

Another object of the invention is to reduce the cost associated with IPPV systems.

The cable television system of the present invention employs a series of taps that are located close to but remote from each subscriber location. Each tap is designed to receive the television signal from the headend and either supply the signal to the subscriber or block out some or all of the signal in response to instructions from the subscriber. The tap sends billing information relating to the programs supplied to the subscriber along the cable. At the end of the cable system, or at some other predetermined point, a device receives billing information from each tap in the system and transmits the information back to the main office through a telephone line or stores the information for retrieval.

BRIEF DESCRIPTION OF THE DRAWINGS

The foregoing objects, as well as others, will become apparent through consideration of the following detailed description of the invention given in connection with the accompanying drawings in which.

DETAILED DESCRIPTION

Figure 1:
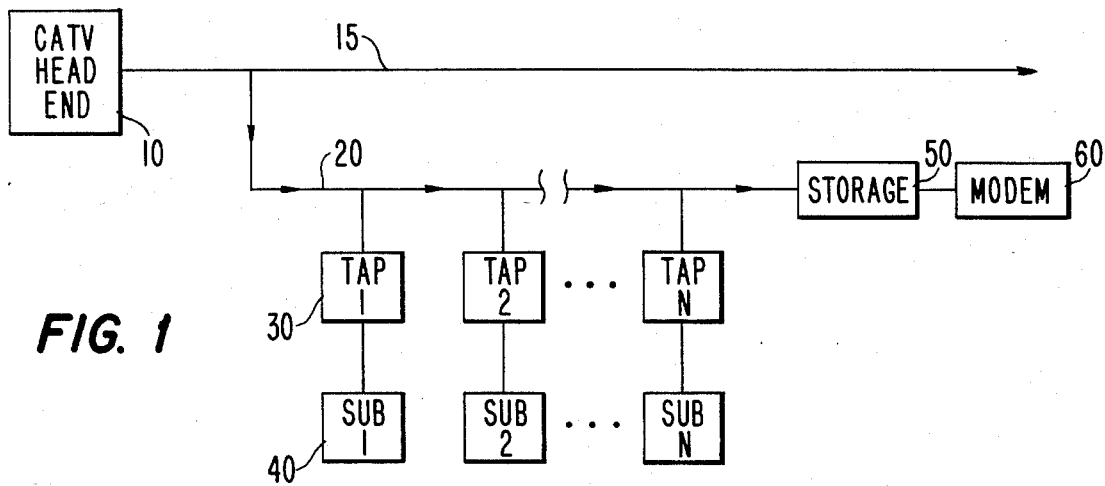
FIG. 1 is a schematic view of a cable television system in accordance with the present invention.

The cable television system of the present invention is shown generally in FIG. 1. The television signal originates in the headend office indicated as 10. The signal is sent along cable 15 containing a plurality of branches 20 where a series of taps 30 (tap 1, tap 2 . . . tap N) receive the signal for subscriber use. Each tap is operative to receive the television signal and supply programs to each subscriber as they are requested. The tap then transmits down cable 20 billing information relating to the programs viewed by the individual subscriber. Storage device 50 is positioned at the end of cable 20 and will receive the billing information transmitted by each of the taps 30 regarding the programs viewed by each subscriber 40. Modem 60 can then transmit the billing information back to the headend at some predetermined time or upon receipt of a transmit request from the headend.

Alternatively, the viewer information could be transmitted up the cable to a storage device. Storage device 50 is located at the end of the cable for illustrative purposes only and can be anywhere in the system.

Figure 2:
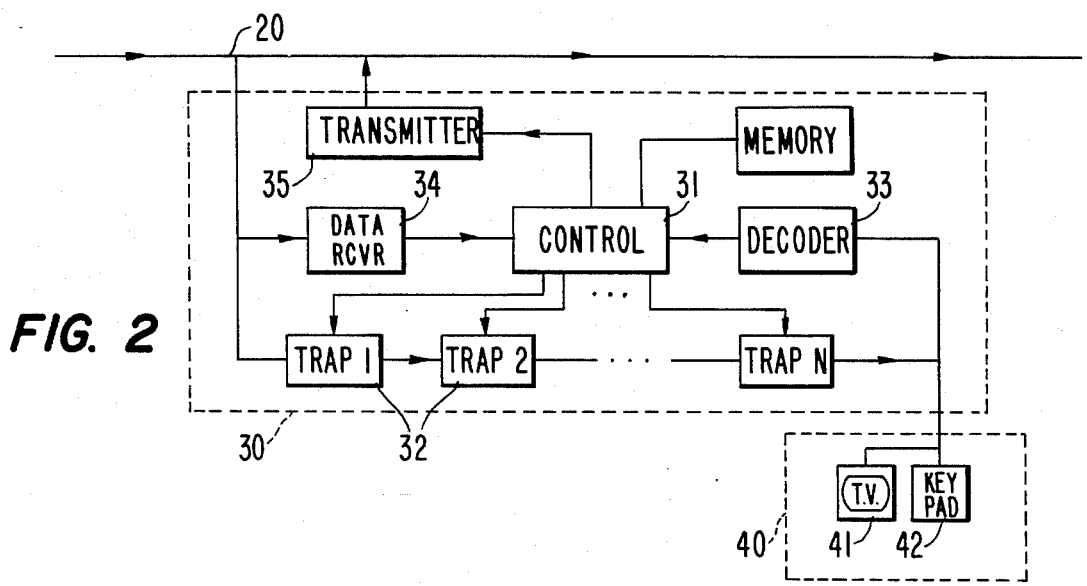
FIG. 2 is a detailed schematic of a tap shown in FIG. 1.

A more detailed illustration of a tap in accordance with the present invention is shown in FIG. 2. Each tap 30 along the system will take energy from the cable 20 and eventually supply that energy to a subscriber television 41. The tap functions to supply only selected channels from the main line to the television, and will deny other channels in the event that the user does not wish to pay for them. The system of FIG. 2 shows a trapping system which may be used for this purpose. Each of the traps 32 is capable of blocking either one channel or a band of contiguous channels depending upon whether the trap is operative. When a trap is deactivated it has no effect on the signal passing through it but when it is operative it will block certain channels. The traps are controlled by a central control device 31. When the system is operated, a user will decide what programs he wishes to see and will transmit selection data to the control unit 31 which will switch the appropriate trap out of the system thus allowing the signal to be received by the subscriber. The selection data is transmitted by a keypad 42 located in the subscriber's home and is received by a decoder 33 within the tap. The decoder 33 then supplies the selection data to the control unit.

The control unit will remember or store billing information relating to the selection data received from the decoder 33. The headend will then request the control unit, by means of data receiver 34, to transfer the billing information out of memory to a transmitter 35 which will transmit the data down the cable in the normal direction of transmission of television programs, at a suitable frequency. The billing information is subsequently received by the storage device 50 (see FIG. 1) and transmitted back to the headend by modem 60.

Since the storage device 50 can receive billing information from many subscribers, only a small number of telephone links are required to transmit this data back to the headend. This information can also be transmitted very quickly. The storage device need only make contact with the headend when the amount of stored information is nearing the capacity of the device.

A number of variations in the above system are possible. For example, storage device 50 can be eliminated and the headend can first establish contact with modem 60 and then request each controller 31 to sequentially transfer its data to transmitter 35. The data will then be transmitted down the line and immediately transferred to the headend via modem 60.

The system could be designed such that each tap was preset to transmit its data at predetermined intervals, every 5 minutes for example. This would eliminate the need for any headend instructions to the controller and would reduce the memory requirements of each tap.

Figure 6:
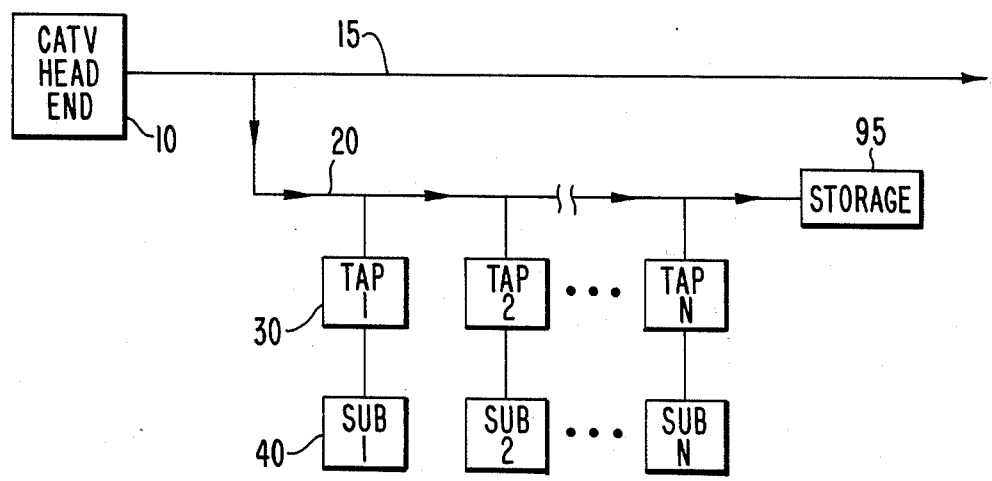
FIG. 6 is a schematic view of a cable television system in accordance with an alternative embodiment of the present invention.

Modem 60 could also be eliminated as shown in FIG. 6. The information could be stored in storage device 95 and could be picked up by a "meter reader" who could simply read the data onto a cassette tape. The storage device itself, of course, could be a cassette recorder and the meter reader would simply change the cassette at certain intervals. This would eliminate the need for telephone lines.

Figure 5:
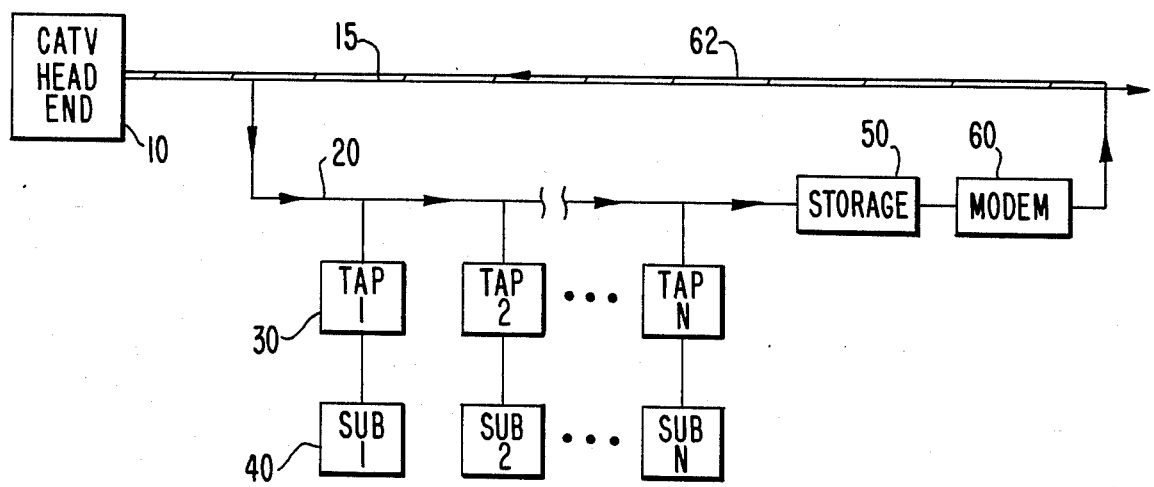
FIG. 5 is a schematic view of a cable television system in accordance with an alternative embodiment of the present invention.

The return path could also consist of a dedicated wire 62 overlased to the CATV strand and returning back along the cable to the headend office as shown in FIG. 5. At each branch, the wire could be paralleled with a backbone return path routed along the main cable. Alternatively, the use of a fibre optic cable would eliminate the need for paralleling.

Figure 3:
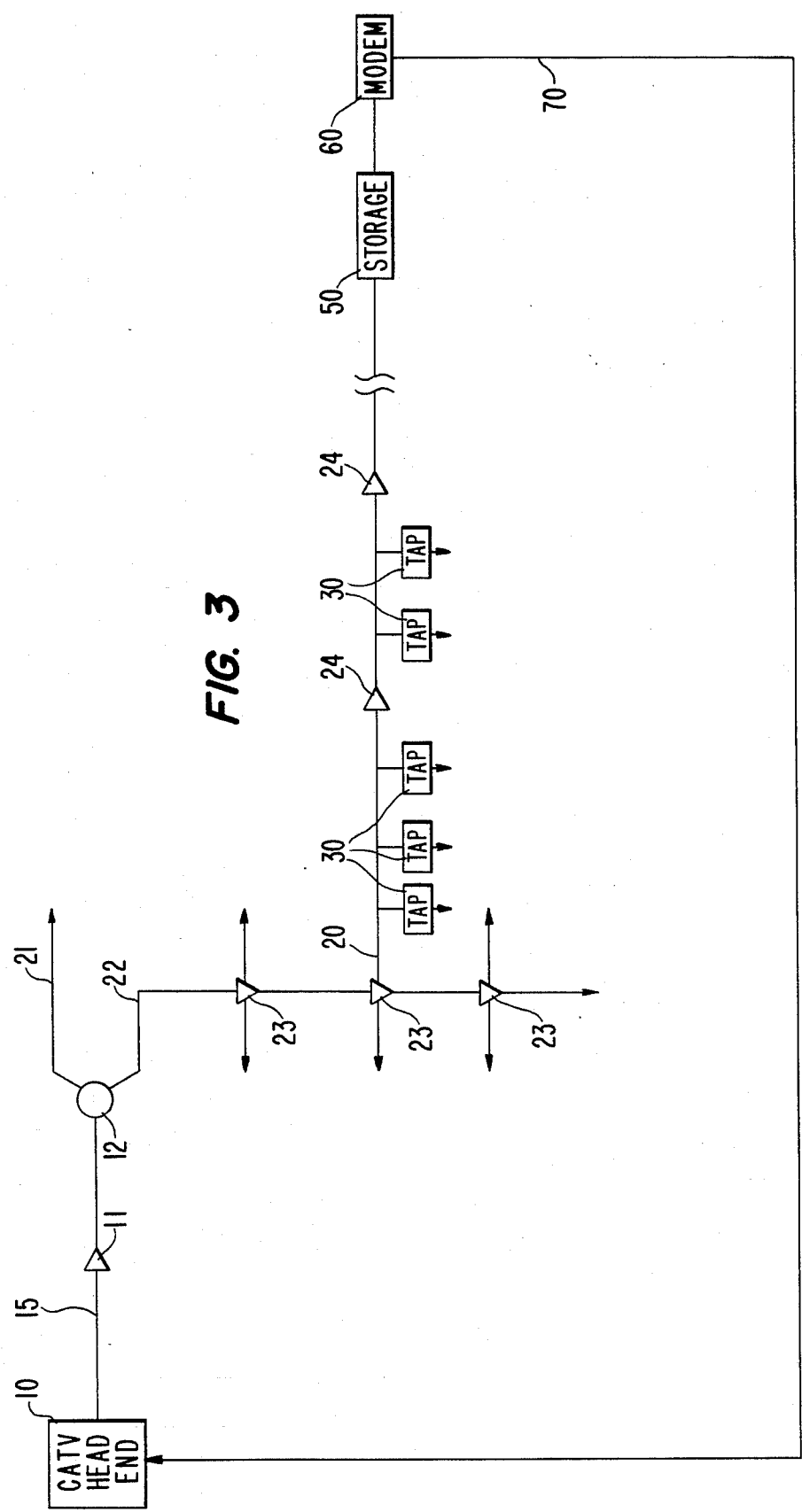
FIG. 3 shows a typical cable television system utilizing the present invention.

FIG. 3 shows a typical cable television system topology modified in light of the present invention. The signal leaves a headend station 10 and is carried down the cable 15 to a trunk amplifier 11. The signal is split at two way splitter 12 and continues along cables 21 and 22. Positioned along the cable is a series of bridging amplifiers 23. The signal is divided at each of these devices and supplied to the subscribers by means of feeder networks. One such feeder network 20 is depicted in the figure. Each of taps 30 operate as previously described to supply the signal to a subscriber (not shown). Line extenders 24 are used to amplify the signal when necessary. Subscriber billing information is stored in storage device 50 and transmitted back to the headend along telephone line 70 via modem 60.

The technique of the present invention may be extended to cases other than that of controlling signals delivered to a subscriber. Some CATV systems, for example, employ status monitoring, in which each trunk amplifier station reports back to the headend certain of its operational parameters (signal level, supply voltage etc.). Normally a two way trunk system is required to provide the return path. However, if the present system were installed, the information could be transmitted to the end of the branch and collected in the same way that viewer billing information is collected. The use of this technique would also allow for monitoring at more points than just the trunk stations, making an elaborate status monitoring system unnecessary.

Figure 4:
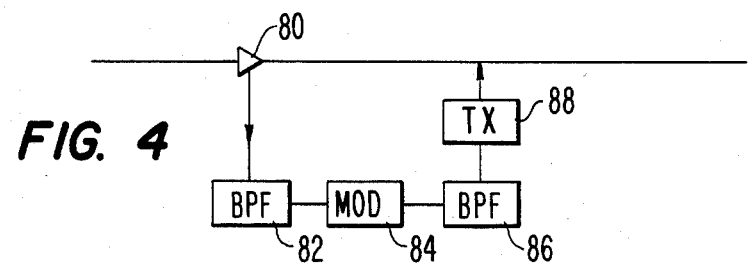
FIG. 4 shows a partial view of an alternative embodiment of the system shown in FIG. 1.

The present invention may be used with conventional set-top terminals or other devices that are not capable of transmitting billing information downstream. Such devices are normally operative to transmit information upstream at a carrier frequency (e.g. 25 MHz) outside of the downstream frequency band. Instead of modifying the existing tap to allow for downstream transmission, the billing information can be billed upstream and turned around at the next active amplifier that it reaches. As shown in FIG. 4, the signal arriving at the amplifier 80 is taken from the cable by a directional coupler (not shown), bandpass filtered by bandpass filter 82, changed to a suitable downstream frequency (i.e. above 54 MHz) by a standard modulator 84, filtered again by filter 86 and transmitted down the cable by transmitter 88 to the receiver as described above.

Whereas preferred embodiments of the invention have been illustrated and described as illustrative of the invention herein, it is to be understood that these embodiments must be taken only as a preferred representation of the invention. Accordingly, various changes and modifications in the arrangement of the components, parts, elements, etc. may be resorted to without departing from the disclosure of the invention or the scope of the appended claims.

We claim:

1. A cable television system for distributing a television signal comprising a plurality of channels from a headend office to a plurality of subscribers, said system comprising:

transmitting means for transmitting the television signal in a first direction along a cable distribution system;

a plurality of taps disposed at diverse locations along the cable system and connected to a plurality of television receivers, each tap comprising receiving means for receiving the television signal from the headend, supplying means for supplying selected channels of said television signal to a television receiver in response to a subscriber-supplied accept signal, and second transmitting means for transmitting billing information along the cable system in said first direction regarding the television channels supplied to said television receiver;

second receiving means for receiving billing information that has been transmitted along the cable system by a plurality of taps; and storage means for storing the billing information received by said second receiving means, said information to be recovered by the headend office in order to bill each subscriber for the channels that were supplied to the television receiver.

2. A cable television system according to claim 1 wherein said supplying means comprises one or more traps operative to block certain channels from said television signal.

3. A cable television system according to claim 2 wherein each of said taps further comprises a central control unit, said central control unit comprising third receiving means for receiving said user-supplied accept signal and deactivating means for deactivating one or more of said traps in response to said user-supplied accept signal in order to supply to the user one or more channels which had been previously blocked.

4. A cable television system according to claim 3 wherein said central control unit further comprises second storage means for storing said billing information prior to the transmission of said billing information by said second transmitting means.

5. A cable television system according to claim 4 wherein said central control unit further comprises transferring means for transferring said billing information stored in said second storage means to said second transmitting means in response to a signal from the headend office.

6. A cable television system according to claim 1 further comprising third transmitting means connected to said storage means for transmitting said billing information to the headend office.

7. A cable television system according to claim 6 wherein said third transmitting means comprises a modem.

8. A cable television system according to claim 6 wherein said third transmitting means comprises a dedicated wire overlashed to the cable distribution system.

9. A cable television system according to claim 6 wherein said third transmitting means comprises a fibre optic cable.

10. A cable television system according to claim 1 wherein said storage means is a cassette recorder.

11. A cable television system for distributing a television signal comprising a plurality of channels from a headend office to a plurality of subscribers, said system comprising:

transmitting means for transmitting the television signal in a first direction along a cable distribution system;

a plurality of taps disposed at diverse locations along the cable system and connected to a plurality of television receivers, each tap comprising receiving means for receiving the television signal from the headend, supplying means for supplying selected channels of said television signal to a television receiver in response to a subscriber-supplied accept signal and second transmitting means for transmitting billing information along the cable system in said first direction;

second receiving means for receiving billing information that has been transmitted along the cable system by a plurality of taps; and third transmitting means for transmitting said billing information to the headend office in order to bill each subscriber for the channels that were supplied to the television receiver.

12. A cable television system according to claim 11 wherein each of said taps further comprises a central control unit comprising third receiving means for receiving said user-supplied accept signal and instructing means for instructing said supplying means to supply certain channels to said television receiver in accordance with the user-supplied accept signal.

13. A cable television system according to claim 12 wherein said central control unit further comprises storage means to store said billing information prior to the transmission of said billing information by said second transmitting means.

14. A cable television system according to claim 13 wherein said central control unit further comprises transferring means for transferring said billing information to said second transmitting means in response to a signal from the headend office.

15. A cable television system according to claim 13 wherein said transferring means will transfer said billing information to said second transmitting means at predetermined intervals.

16. A cable television system according to claim 11 further comprising a keypad supplied to each subscriber for generating said user-supplied accept signal.

17. A cable television system for distributing a television signal comprising a plurality of channels from a head-end office to a plurality of subscribers, said system comprising:

transmitting means for transmitting the television signal in a first direction along a cable distribution system;

a plurality of taps disposed at diverse locations along the cable system and connected to a plurality of television receivers, each tap comprising receiving means for receiving the television signal from the headend, supplying means for supplying selected channels of said television signal to a television receiver in response to a subscriber-supplied accept signal, and second transmitting means for transmitting along the cable system in said first direction, billing information regarding the television channels supplied to said television receiver;

second receiving means for receiving said billing information transmitted by said second transmitting means, third transmitting means for transmitting along the cable system in a second direction, said billing information received by said second receiving means;

third receiving means for receiving billing information regarding a plurality of users that has been transmitted along the cable system; and storage means for storing the billing information received by said third receiving means, said information to be recovered by the headend office in order to bill each subscriber for the channels that were supplied to the television receiver.

18. A cable television system for distributing a television signal comprising a plurality of channels from a head-end office to a plurality of subscribers, said system comprising:

transmitting means for transmitting the television signal in a first direction along a cable distribution system;

a plurality of taps disposed at diverse locations along the cable system and connected to a plurality of television receivers, each tap comprising receiving means for receiving the television signal from the headend, supplying means for supplying selected channels of said television signal to a television receiver in response to a subscriber-supplied accept signal, and second transmitting means for transmitting along the cable system in said first direction, billing information regarding the television channels supplied to said television receiver;

second receiving means for receiving said billing information transmitted by said second transmitting means, third transmitting means for transmitting along the cable system in a second direction, said billing information received by said second receiving means;

third receiving means for receiving billing information regarding a plurality of users that has been transmitted along the cable system; and fourth transmitting means for transmitting said billing information to the headend office in order to bill each subscriber for the channels that were supplied to the television receiver.

19. A method for distributing, in a cable television system, a television signal comprising a plurality of channels from a headend office to a plurality of subscribers, said cable television system including a plurality of taps disposed at diverse locations along a cable distribution system and connected to a plurality of television receivers, said method comprising the steps of:

transmitting the television signal in a first direction along said cable distribution system;

receiving the television signal at one or more taps;

supplying selected channels of said received television signal to a television receiver in response to a subscriber-supplied accept signal;

transmitting billing information along the cable system in said first direction regarding the television channels supplied to said television receiver;

receiving billing information that has been transmitted along the cable system by a plurality of taps; and storing the received billing information for subsequent recovery by the headend office in order to bill each subscriber for the channels supplied to the television receiver.

20. A method for distributing, in a cable television system, a television signal comprising a plurality of channels from a headend office to a plurality of subscribers, said cable television system including a plurality of taps disposed at diverse locations along a cable distribution system and connected to a plurality of television receivers, said method comprising the steps of:

transmitting the television signal in a first direction along said cable distribution system;

receiving the television signal at one or more taps;

supplying selected channels of said received television signal to a television receiver in response to a subscriber-supplied accept signal;

transmitting billing information along the cable system in said first direction regarding the television channels supplied to said television receiver;

receiving billing information that has been transmitted along the cable system by a plurality of taps; and transmitting the received billing information to the headend office in order to bill each subscriber for the channels supplied to the television receiver.

* * * * *